Nov. 11, 1952 G. S. JENKINS ET AL 2,617,499
INCLINED-RAILWAY SAFETY CAR
Filed Aug. 20, 1949 2 SHEETS—SHEET 1
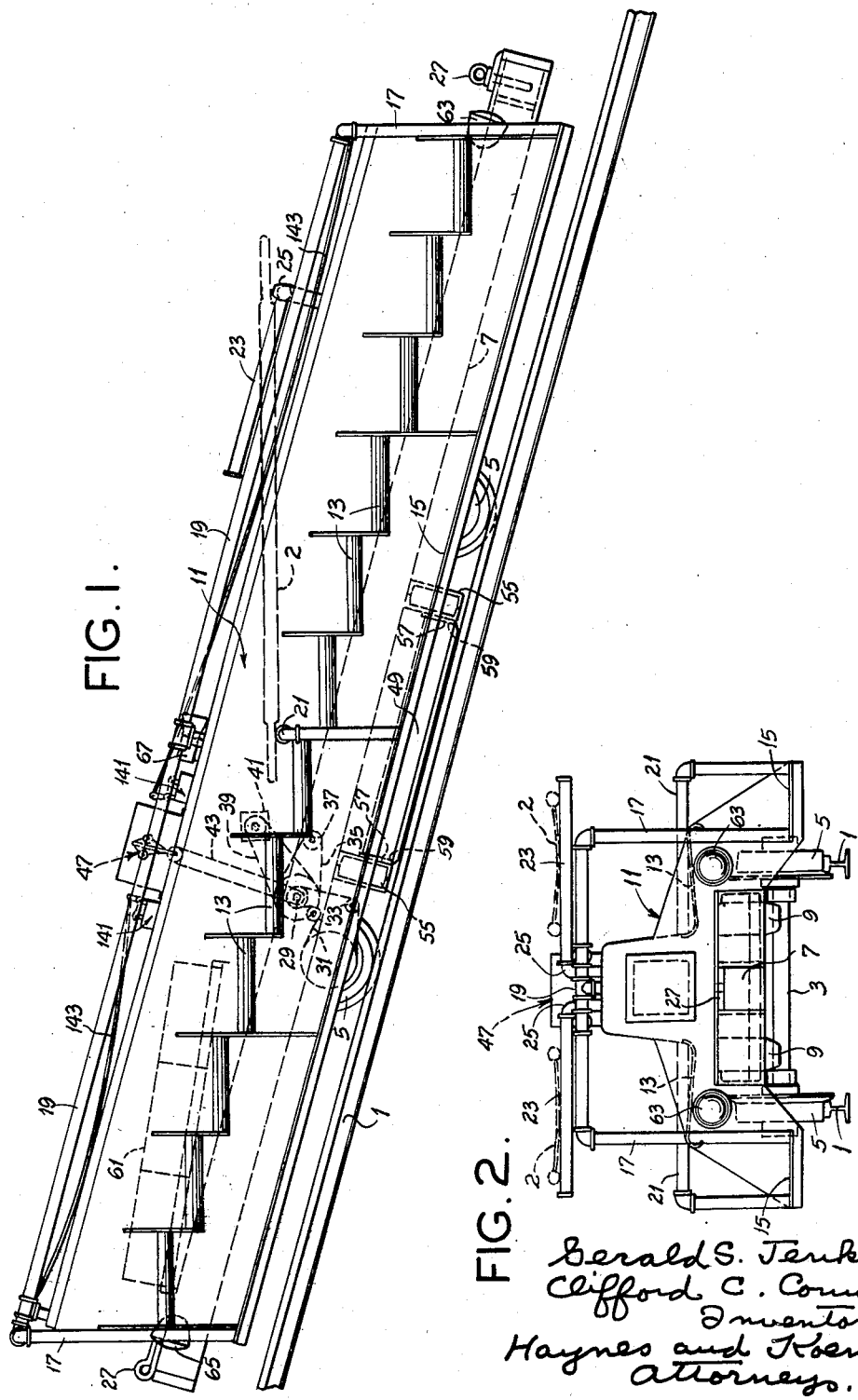

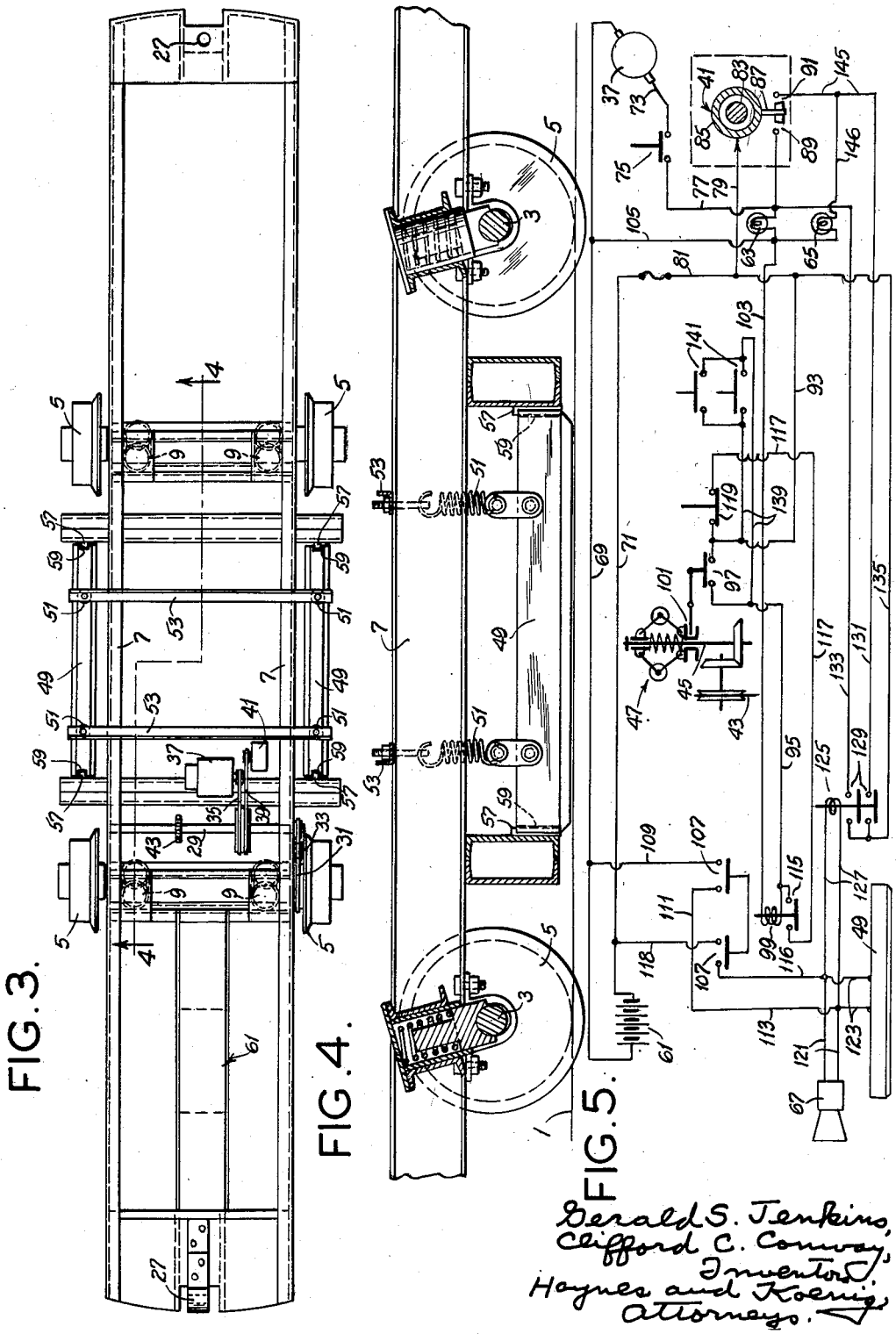

Patented Nov. 11, 1952

2,617,499

UNITED STATES PATENT OFFICE 2,617,499

INCLINED-RAILWAY SAFETY CAR

Gerald S. Jenkins and Clifford C. Conway, Herrin, Ill., assignors, by mesne assignments, to said Jenkins Application August 20, 1949, Serial No. 111,432

2 Claims. (Cl. 188—165)

This invention relates to inclined-railway safety cars, and with regard to certain more specific features, to gravity-operated, cable-controlled man-trip or pilot cars for use in mines and the like.

Some mines have entry tunnels which slope on the order of 15° or so, incorporating track for gravity-operated, cable-controlled cars, instead of vertical shafts having elevators. The operation of the cars is effected by a cable controlled from a power sheave near the tunnel mouth and operated by a suitable prime mover. There exists in such cases a possibility of a cable breaking with consequent runaway. Moreover in the case of man-trip cars, men may fall from them. In these events and others, it is desirable to employ a car having safety and braking features improved over those heretofore employed for the purpose.

Briefly, the present invention provides the desired safety features on a truck carrying a body having a side seating arrangement so that when operated upon an incline the seats are horizontal, and having a stepped arrangement with a boarding rail beneath the stepped seats. Included are foldable stretcher rests for stretcher cases when they occur. The car carries a set of batteries. An axle of the car drives a generator for charging the battery. The circuit is arranged so that the generator charges only on the down trip. Front and rear headlamps are automatically operable respectively on the down and up trips. One of the axles of the car also drives a centrifugal governor controlling an electric circuit from the battery to a magnetic track brake. If the car overspeeds, the governor causes a track brake to be set and thereafter it remains set even though the governor again slows down from its brake tripping speed. There is also provision for manually setting the track brake independently of the governor. The circuit is also so arranged that when the track brake sets, an audible warning device automatically goes into action and both of the up and down headlights are lighted. This is designed to facilitate the dispatching of help to any car in connection with which an emergency has occurred. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated:

Fig. 1 is a side elevation of our new car on a 15° incline, parts being broken away to illustrate certain features;

Fig. 2 is a right-hand elevation viewed on a level with the supporting rails;

Fig. 3 is a plan view of certain truck parts which support the body, and exposing certain safety features;

Fig. 4 is a detail section taken on line 4—4 of Fig. 3; and,

Fig. 5 is a mechanical and wiring diagram.

Similar reference characters indicate corresponding parts throughout the several views of the drawings.

Referring now to the drawings, numeral 1 shows the usual rails in a tunnel at, say, 15° slope. At 3 are shown axles supported by wheels 5 carried on the rail. A truck frame or bed is shown generally at 7, this being carried upon the axles 3 by means of spring-supported bolsters 9. The bed 7 carries a body indicated generally at 11, which includes a stepped arrangement of side seats 13 above running boards 15. End handrails 17 are provided with central longitudinal handrails 19. A lower central stretcher crossrail 21 serves in connection with endwise stretcher crossrails 23 to support stretchers horizontally when the car is on a slope. The stretcher rails 23 are carried on swivels 25 so that they may be folded inward when not required as shown by solid lines in Fig. 1. In Fig. 2 they are shown outward. An exemplary stretcher position when rails 23 are out is illustrated by dotted lines 2 in Figs. 1 and 2. The car carries end coupling means 27 for attachment to other cars or the control cable already mentioned.

At 29 is shown a countershaft on the bed 7 and driven by a sprocket and chain drive 31 from one of the axles 3, guide sprockets 33 being employed in this connection. It will be understood that other forms of drive may be used at this point, such as a gear drive. The shaft 29 is coupled through a chain drive 35 with a generator 37. It is also connected through a chain drive 39 with the rotor of a plugging switch 41, the function of which will appear. This countershaft is also connected through a chain drive 43 with the driving member 45 of a centrifugal governor 47. The governor is illustrated as being of the flyball type, but it will be understood that other types of centrifugal governors may be used.

At numerals 49 are shown electromagnetic track brake shoes which are spring-suspended by springs 51 from crossbars 53 attached to the frame 7. Additional crossbars 55 have vertical tongues 57 which engage with grooves 59 in the ends of the track brake. These tongues act as vertical guides for the motion of these brakes. The brakes are suspended in the planes of the rails and when electrically energized are inductively and magnetically drawn to the rails for sliding contact with consequent braking action through the bars 55 to the car as a whole. A General Electric type ES-109-E-11 track brake is satisfactory for the purpose.

One of the chief advantages of an electric type brake is that the braking effort is independent of car weights and is available in addition to any other braking. Brakes applying their effect through the wheels are often inadequate because of inadequate friction allowing wheels to slip or slide on a grade. The brake as presently used exerts a braking effort of approximately 8000 pounds.

At numeral 61 is shown a battery, which is mounted in the frame bed 7 at an angle to the rails which is about one-half of the angle of the rails to the horizontal, so that the liquid of these batteries (if of the wet type) will not spill either when the car is on the level or operative at maximum track angle.

At numeral 63 are shown the down headlights and at 65 the up headlights. Numeral 67 illustrates an audible warning device such as an electric horn or siren.

Fig. 5 is a wiring diagram wherein the battery 61 has leads 69 and 71. Lead 69 connects with the generator 37. The other side of the generator has a connection 73 through a charging control relay and reverse current protector 75 of the usual type. Line 73 may be connected with 71 via the plugging switch 41 and wire 77, contact 87 when closed, and wires 79 and 81. The plugging switch 41 is of a standard variety such as, for example, GE-CR-2962. Such a switch has a rotary magnetic core such as 83, which effects a drag in a surrounding member 85 carrying a movable switch contact 87. The member 83 in the present case is driven from one of the axles 3 through the train 31, 29, 39, as already made clear. Generator 37 operates properly only in one direction. This should occur when the car descends. The plugging switch 41 is arranged so that the rotation of the driving axle 3 under such conditions will result in closing contacts 87, 89. This connects the generator with the battery, through connections 73, 77, 89, 87, 79, 81, 71 and 69. When drawn up-grade, the contact 89 of switch 41 is broken and a second reverse-operating contact 91 is closed for purposes which will appear. The wire 81 has connections 93 and 95 through a contact switch 97 and the coil of a relay switch 99. Switch 97 is closed when the speed-responsive member 101 of the governor 47 reaches a predetermined position in response to increase in speed of the car. When this switch closes, current passes from the battery 61 via 71, 81, 93, 97, 95, 99 and back to the other lead 69 of the battery via wires 103, 105. This closes a double-break switch 107 connected across the battery lines 69, 71 via wires 109, 111, 113, 116 and 118 and connected apparatus to be described. It also closes a switch 115 in a holding circuit 117 which, through a release switch 119, wires 93 and 81, forms a return to the line 71. Therefore, after the governor-operated switch 97 once closes, it may return to open position without deenergizing coil 99.

When the double-break switch 107 closes, three things happen. First, an audible warning is given by the horn 67, which is connected by wires 121 to wires 113 and 116. Second, the track brakes 49 are energized, which are connected by wires 123. Third, a relay switch 125 is energized over wires 127. Switch 125 closes two sets of contacts 129 in lines 131 and 133, respectively, the other side of the switch being connected through line 135 with side 71 of the battery circuit 69. The headlamps 63 and 65 are connected via line 105 with the other side of the battery circuit and with the respective lines 131, 133. Thus whenever the car and the governor 47 driven thereby overspeed, the audible warning device 67, the track brakes 49, the down headlights 63 and the up headlights 65 are all energized. This stops the car with all signals given and all of these devices remain energized until a release switch 119 in the holding circuit 117, 93 is opened manually. Provision is also made for energizing the coil 99 and holding circuit independently of the governor-operated switch 97. This is done by means of a by-pass circuit 139 in which are parallel emergency switches 141. Emergency ropes 143, strung along the car, permit any man on it to make an emergency stop by operating either or both switches 141.

The down headlights 63 are closed across the battery lines 69, 71 when the downward movement of the car moves the plugging switch 41 to close contacts 89 (see 81, 79, 87, 89, 105). This is at the same time that the generator is plugged by this switch 41 in across the same lines 69 and 71. When the car is drawn up the grade, the contacts 91 of the plugging switch 41 are closed, whereupon only the up headlights 65 are placed across the lines 69, 71 via connections 81, 79, 91, 145, 146, 105. It will be understood the plugging switch 41 automatically seeks a neutral position when the car is stationary, thus cutting off the generator 37 and both sets of headlights 63 and 65, unless the car has been brought to a stop after overspeeding. In the latter event, the headlights do not go out, since they are energized along with the devices 67 and 49, via relay switch 125, 129.

Operation is as follows, assuming a car to be descending:

The generator 37 is driven in its charging direction and the plugging switch 41 is driven to close contacts 89. This connects the generator with the battery. Closure of switch 89 also connects the down headlights 63 only across the battery. If the car overspeeds, the governor 47 closes switch 97, thus closing the holding switch 115 and the double-break switch 107. The latter energizes from the battery the brakes 49, horn 67 and relay 125, the latter resulting in the energization of both sets of headlights 63 and 65. The sound and light warnings are designed to bring help.

Or, if without overspeeding an emergency occurs, such, as, for example, a man falling from the car, either one of the emergency switches 141 may be closed from one of the ropes 143, which has the same effect as for an emergency stop, the switch 97 being by-passed via lines 139. If a man has been injured and becomes a stretcher case, his stretcher may be laid across the supports 21 and 23, being then horizontal.

When the car is drawn up-grade, the generator 37 turns in the wrong direction to be connected for current supply to the battery. Under this condition, it is cut off from the battery by reverse rotation of the plugging switch 41 and opening of the contacts 89. Closure of contacts 91 connects the up headlight 65 only.

Among the advantages of the invention is the automatic application of a reliable type of brake upon overspeeding with the holding circuit to prevent automatic release when the car slows to a proper speed or stop. Moreover, the governor action may be overridden manually for emergency stops. Coupled with this is the means for selectively cutting in the down headlights and the generator upon down-grade movement, and cutting off the generator and selectively lighting the up headlights upon up-grade movement. The selective lighting action of the headlights is overridden by a control therefor lighting both of them in coordination with the application of the brakes and sounding of the warning device.

A particular advantage of lighting the up headlight under emergency stop conditions is that such a stop usually results in paying out too much cable from the sheave, which forms slack. The lighted up headlight in connection with the audible warning signal provides means for signalling the hoisting engineer that the slack has not been taken out of this cable. A signal that this has occurred can be given by a man at the car through operation of the release switch 137.

While it is intended that the operation of the generator 37 upon down-grade car movement shall be sufficient to maintain a charge in the battery 61, it will be understood that these batteries may in addition be plugged in at suitable current sources along the track for charging purposes.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:
1. On an inclined-railway car, an electric brake, a battery for energizing the brake, a normally open switching circuit for connecting the battery to energize the brake, a switch for closing said switching circuit, a car-speed-responsive governor adapted to close said switch above a predetermined car speed, a holding circuit energized by said switch to maintain the switching circuit continuously to energize the brake beneath said predetermined car speed, and at least one manually operable switch connected across the governor-operated switch for independently energizing the switching circuit.

2. On an inclined-railway car, an electric brake, a battery for energizing the brake, a normally open switching circuit for connecting the battery to energize the brake, a governor-operated switch for closing said switching circuit, a car-speed-responsive governor adapted to close said switch above a predetermined car speed, a holding circuit energized by said switch to maintain the switching circuit continuously to energize the brake beneath said predetermined car speed, at least one manually operable switch connected across the governor-operated switch for independently energizing the switching circuit, and an additional manually operable brake releasing switch in series with the governor switch.

GERALD S. JENKINS.
CLIFFORD C. CONWAY.

REFERENCES CITED

The following references are of record in the file of this patent:

UNITED STATES PATENTS

| Number | Name | Date |
| --- | --- | --- |
| 257,403 | Starr | May 2, 1882 |
| 1,183,677 | Sanborn et al. | May 16, 1916 |
| 1,298,032 | Furlow | Mar. 25, 1919 |
| 2,035,047 | Cotter | Mar. 24, 1936 |
| 2,103,706 | Bone | Dec. 28, 1937 |
| 2,124,125 | Schoepf et al. | July 19, 1938 |
| 2,307,151 | Moore | Jan. 5, 1943 |
| 2,468,199 | Hines | Apr. 26, 1949 |